US006995873B1

(12) United States Patent
Mitchell et al.

(10) Patent No.: US 6,995,873 B1
(45) Date of Patent: Feb. 7, 2006

(54) FLEXIBLE DIGITAL HALFTONING

(75) Inventors: Joan L. Mitchell, Longmont, CO (US); James F. Crossland, Boulder, CO (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 09/713,985

(22) Filed: Nov. 16, 2000

(51) Int. Cl.
*G06K 15/00* (2006.01)

(52) U.S. Cl. .................................... 358/3.04; 358/3.06

(58) Field of Classification Search ............... 358/3.04, 358/3.06, 3.09, 3.1, 3.13, 3.3, 3.07, 3.2, 535; 382/205, 217
See application file for complete search history.

(56) References Cited

U.S. PATENT DOCUMENTS 4,926,180 A * 5/1990 Anastassiou ................ 341/159
5,963,714 A * 10/1999 Bhattacharjya et al. ...... 358/1.9
6,714,318 B1 * 3/2004 Morris et al. ................ 358/1.9

* cited by examiner

Primary Examiner—Jerome Grant, II
(74) Attorney, Agent, or Firm—Blakely Sokoloff Taylor & Zafman LLP (57) ABSTRACT

Apparatus and methods for flexible digital halftoning are provided in which novel pattern choices are allowed by not restricting the basic halftone patterns to grow sequentially. Rather, positions in a threshold array allow multiple transitions between on (i.e., printed with toner/ink) and off (not printed) as a function of the input value at the corresponding position. In one embodiment, multiple threshold matrices are employed and the output decision is a vote (e.g., exclusive OR) of the outputs of the individual threshold matrices. In another embodiment, each position contains an arbitrary bit vector to express the output for each input. In yet another embodiment, space efficiency may be achieved by sorting the arbitrary bit vectors into collections of adjacent decisions for a given input value, such as into bytes.

14 Claims, 13 Drawing Sheets

| Input Level | Row1 Bit Vector | Row2 Bit Vector | Row3 Bit Vector | Row4 Bit Vector |
|---|---|---|---|---|
| 0 | 0000 | 0000 | 0000 | 0000 |
| 1 | 0000 | 0100 | 0000 | 0000 |
| 2 | 0000 | 0100 | 0100 | 0000 |
| 3 | 0000 | 0100 | 0100 | 0100 |
| 4 | 0000 | 0110 | 0110 | 0000 |
| 5 | 0100 | 1110 | 0100 | 0000 |
| 6 | 0110 | 0110 | 0110 | 0000 |
| 7 | 0110 | 1110 | 0110 | 0000 |
| 8 | 0110 | 1111 | 0110 | 0000 |
| 9 | 1110 | 1110 | 1110 | 0000 |
| 10 | 0100 | 1111 | 1111 | 0100 |
| 11 | 1110 | 1110 | 1110 | 1100 |
| 12 | 1110 | 1110 | 1110 | 1110 |
| 13 | 1110 | 1110 | 1110 | 1111 |
| 14 | 1110 | 1110 | 1111 | 1111 |
| 15 | 1110 | 1111 | 1111 | 1111 |
| 16 | 1111 | 1111 | 1111 | 1111 |

Figure 10A

| Input Level | Row1.Row1 | Row2.Row2 | Row3.Row3 | Row4.Row4 |
|---|---|---|---|---|
| 0 | 0000.0000 | 0000.0000 | 0000.0000 | 0000.0000 |
| 1 | 0000.0000 | 0100.0100 | 0000.0000 | 0000.0000 |
| 2 | 0000.0000 | 0100.0100 | 0100.0100 | 0000.0000 |
| 3 | 0000.0000 | 0100.0100 | 0100.0100 | 0100.0100 |
| 4 | 0000.0000 | 0110.0110 | 0110.0110 | 0000.0000 |
| 5 | 0100.0100 | 1110.1110 | 0100.0100 | 0000.0000 |
| 6 | 0110.0110 | 0110.0110 | 0110.0110 | 0000.0000 |
| 7 | 0110.0110 | 1110.1110 | 0110.0110 | 0000.0000 |
| 8 | 0110.0110 | 1111.1111 | 0110.0110 | 0000.0000 |
| 9 | 1110.1110 | 1110.1110 | 1110.1110 | 0000.0000 |
| 10 | 0100.0100 | 1111.1111 | 1111.1111 | 0100.0100 |
| 11 | 1110.1110 | 1110.1110 | 1110.1110 | 1100.1100 |
| 12 | 1110.1110 | 1110.1110 | 1110.1110 | 1110.1110 |
| 13 | 1110.1110 | 1110.1110 | 1110.1110 | 1111.1111 |
| 14 | 1110.1110 | 1110.1110 | 1111.1111 | 1111.1111 |
| 15 | 1110.1110 | 1111.1111 | 1111.1111 | 1111.1111 |
| 16 | 1111.1111 | 1111.1111 | 1111.1111 | 1111.1111 |

Figure 10B

| R,C | Input Level | Array of Bytes | | R,C | Input Level | Array of Bytes | | R,C | Input Level | Array of Bytes | | R,C | Input Level | Array of Bytes |
|---|---|---|---|---|---|---|---|---|---|---|---|---|---|---|
| 2,1 | 0 | 00000000 | | 2,2 | 0 | 00000000 | | 2,3 | 0 | 00000000 | | 2,4 | 0 | 00000000 |
| 2,1 | 1 | 00000000 | | 2,2 | 1 | 00000001 | | 2,3 | 1 | 00000000 | | 2,4 | 1 | 00000000 |
| 2,1 | 2 | 00000000 | | 2,2 | 2 | 00000001 | | 2,3 | 2 | 00000000 | | 2,4 | 2 | 00000000 |
| 2,1 | 3 | 00000000 | | 2,2 | 3 | 00000001 | | 2,3 | 3 | 00000000 | | 2,4 | 3 | 00000000 |
| 2,1 | 4 | 00000000 | | 2,2 | 4 | 00000001 | | 2,3 | 4 | 00000001 | | 2,4 | 4 | 00000000 |
| 2,1 | 5 | 00000001 | | 2,2 | 5 | 00000001 | | 2,3 | 5 | 00000001 | | 2,4 | 5 | 00000000 |
| 2,1 | 6 | 00000000 | | 2,2 | 6 | 00000001 | | 2,3 | 6 | 00000001 | | 2,4 | 6 | 00000000 |
| 2,1 | 7 | 00000001 | | 2,2 | 7 | 00000001 | | 2,3 | 7 | 00000001 | | 2,4 | 7 | 00000000 |
| 2,1 | 8 | 00000001 | | 2,2 | 8 | 00000001 | | 2,3 | 8 | 00000001 | | 2,4 | 8 | 00000001 |
| 2,1 | 9 | 00000001 | | 2,2 | 9 | 00000001 | | 2,3 | 9 | 00000001 | | 2,4 | 9 | 00000000 |
| 2,1 | 10 | 00000001 | | 2,2 | 10 | 00000001 | | 2,3 | 10 | 00000001 | | 2,4 | 10 | 00000001 |
| 2,1 | 11 | 00000001 | | 2,2 | 11 | 00000001 | | 2,3 | 11 | 00000001 | | 2,4 | 11 | 00000000 |
| 2,1 | 12 | 00000001 | | 2,2 | 12 | 00000001 | | 2,3 | 12 | 00000001 | | 2,4 | 12 | 00000000 |
| 2,1 | 13 | 00000001 | | 2,2 | 13 | 00000001 | | 2,3 | 13 | 00000001 | | 2,4 | 13 | 00000000 |
| 2,1 | 14 | 00000001 | | 2,2 | 14 | 00000001 | | 2,3 | 14 | 00000001 | | 2,4 | 14 | 00000000 |
| 2,1 | 15 | 00000001 | | 2,2 | 15 | 00000001 | | 2,3 | 15 | 00000001 | | 2,4 | 15 | 00000001 |
| 2,1 | 16 | 00000001 | | 2,2 | 16 | 00000001 | | 2,3 | 16 | 00000001 | | 2,4 | 16 | 00000001 |

Input Levels

| 5 | 9 | 4 | 15 | 10 | 0 | 0 | 8 |
|---|---|---|---|---|---|---|---|

Output Pels

| 1 | 1 | 1 | 1 | 1 | 0 | 0 | 1 |
|---|---|---|---|---|---|---|---|

FLEXIBLE DIGITAL HALFTONING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of digital halftoning. More particularly, the invention relates to a method and apparatus for digital halftoning that provides flexibility in terms of pattern choices by enabling a position in the threshold matrix to make multiple transitions between on (e.g., printed with toner/ink) and off (e.g., not printed) thereby allowing visually displeasing patterns to be avoided without loss of gray levels 2. Description of the Related Art Image processing apparatus and processes are evaluated in part, by their capability of delivering a complete gray scale at normal viewing distances. This capability is to a certain extent based upon the halftoning techniques employed. Halftoning is a widely used mechanism for converting input pixels represented with multiple bits of information (usually 8 bits) into bilevel picture elements ("pels"). The goal in halftoning continuous-tone images or multi-level computer generated graphics is to give an illusion of the many shades contained in the original or interpolated multi-bit values per component sample while using only one bit per sample. One traditional technique for halftoning is to create a threshold matrix (usually a different one for each color component) and use it to select a threshold value per sample. The threshold matrix is generally of much smaller dimensions than the image. Halftoning is accomplished by progressing through the input line and the threshold matrix simultaneously, comparing each input gray value with the corresponding threshold value in the threshold matrix. If the input gray value is greater than or equal to the threshold value, a black (i.e., fully saturated) corresponding output pel is generated, otherwise the corresponding output pel is white. For each line in the image, a given threshold matrix row is cycled through repetitively. The next row is used for the next line. After the last row in the threshold matrix is used, the top row of the threshold matrix is used again.

Figure 1A:
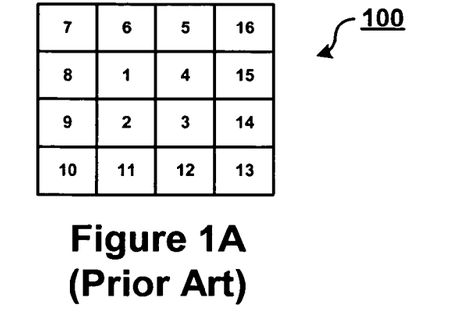
FIG. 1A illustrates an exemplary basic cell.
Figure 1B:
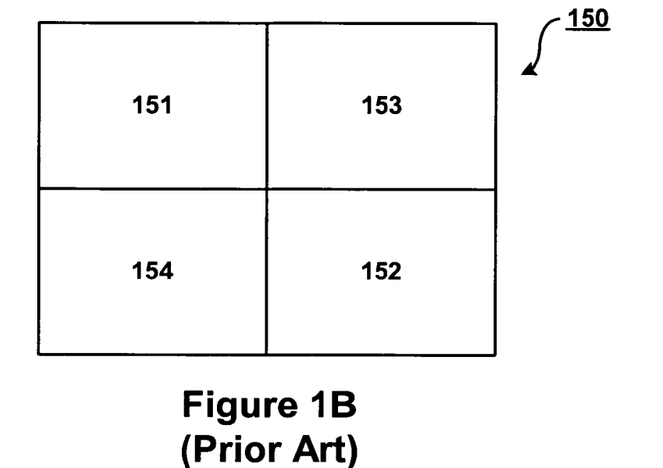
FIG. 1B illustrates an exemplary supercell.

These threshold matrices are generally referred to as "supercells." An exemplary supercell and its relationship to basic cells are discussed briefly with reference to FIGS. 1A and 1B. FIG. 1A illustrates the structure of a basic cell 100. In FIG. 1A, the basic cell 100 comprises a 4×4 pel matrix. As described further below, at present, element positions within the basic cell structure 100 are manipulated in a sequential manner (as indicated by the numbers within the elements) to achieve output gray levels. Incrementing from one output gray level to the next is accomplished by preserving the current pattern represented by the elements of the basic cell structure 100 and turning on one additional element.

FIG. 1B illustrates an exemplary supercell that is made up of much smaller basic cells such as that depicted in FIG. 1A. The four quadrants of the supercell are labeled to show the order in which the basic cells are filled. In this example, the supercell 150 comprises four basic cells 151–154. The basic cells 151–154 set the halftone's lines per inch thereby determining the level of detail that may be preserved while the size of the supercell 150 determines the number of shades obtainable. According to the current state of the art, a single halftone threshold matrix is used to convert grayscale images and graphics into binary images. The density of the pels in a region is indicative of the original values in that region.

Figure 1C:
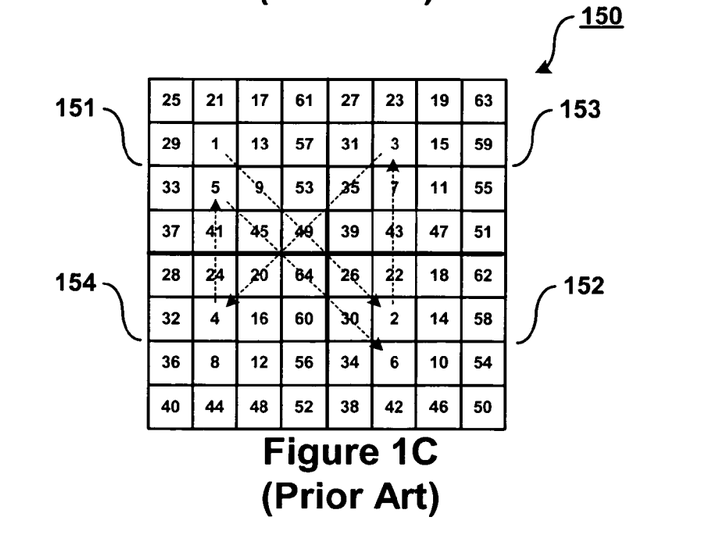
FIG. 1C illustrates the use of four basic cells within the supercell structure of FIG. 1B to achieve 65 output levels.

FIG. 1C illustrates using four basic cells to achieve 64 levels by incrementally filling the basic cells in accordance with the ordering of FIG. 1B. If the input image only had 65 levels, i.e., 0 to 64, then FIG. 1C could represent a traditional threshold matrix. Each element contains the comparison, i.e., threshold, value used to determined whether to print the corresponding position in the input image or not. For purposes of this application, the convention of the input value being greater than or equal to the comparison value is employed for the output to be a one (e.g., printed). Of course, this convention is arbitrary and other conventions may be employed. For example, an alternative convention would be to enable (e.g., print) the output pel when the input value is less than or equal to the threshold value.

Figure 2:
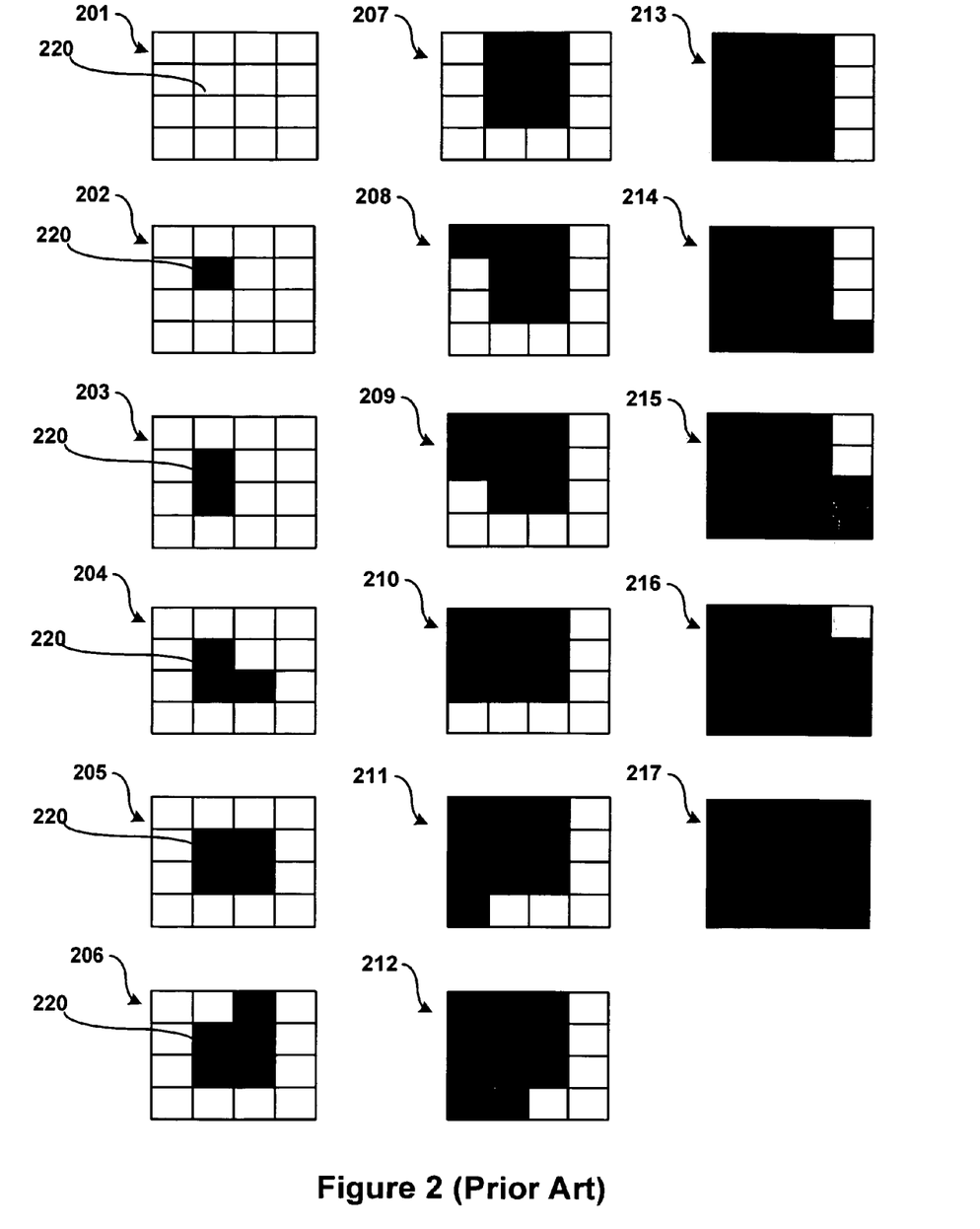
FIG. 2 illustrates exemplary prior art basic pattern growth.

As illustrated by the prior art basic pattern growth example of FIG. 2, N×M+1 output gray levels may be represented with an N×M halftone matrix. For example, a 4×4 halftone matrix allows the generation of 17 levels, i.e., white 201 plus 16 other levels 202–217, to be achieved by turning one and only one element on for each subsequent level. Currently, subsequent gray levels are generated based upon previous gray levels by turning one and only one additional element on, thereby requiring patterns for each subsequent gray level to be a superset of those patterns corresponding to preceding gray levels. For example, once element 220 of the pattern is turned on, it remains on for the rest of the basic patterns. As a result, it can be difficult to avoid bad patterns, such as those that produce visual artifacts and/or undesirable textures or are otherwise visually displeasing, while also seeking to maximize the number of gray levels.

BRIEF SUMMARY OF THE INVENTION

A method and apparatus are described for implementing flexible digital halftoning. According to one embodiment, a new data structure is employed for use during halftoning. The new data structure is referred to as a flexible, halftoning, threshold array and is configured to allow more than one transition in output values as a function of possible input values for at least one position in the halftoning threshold array.

According to another embodiment, a flexible halftoning technique is provided. An input image is received and for each pel of an output image corresponding to the input image, a level to be output for the pel is determined by applying a novel threshold array to the input image. The novel threshold array is configured to cause more than one transition at one or more pel positions as a function of input values.

According to yet another embodiment, halftoning processing includes receiving an input image and determining a level to be output for each pel of a corresponding output image by applying multiple threshold matrices to each sample for each component of the given input image.

Other features of the present invention will be apparent from the accompanying drawings and from the detailed description that follows.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION OF THE INVENTION

A method and apparatus are described for implementing flexible digital halftoning. Broadly stated, embodiments of the present invention seek to solve or at least alleviate the above-referenced problems of conventional halftoning approaches by employing a thresholding mechanism that allows flexibility in terms of pattern choices. For example, according to one embodiment, rather than being constrained to a superset of those patterns corresponding to preceding gray levels, one or more positions in a threshold matrix may make multiple transitions between on (e.g., printed with toner/ink) and off (e.g., not printed). Advantageously, this novel halftoning approach allows bad patterns, such as those that produce visual artifacts and/or undesirable textures or are otherwise visually displeasing, to be avoided in basic pattern growth without loss of gray levels.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product that may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

For convenience, embodiments of the present invention will be described with reference to a 8×8 supercell comprising four 4×4 basic cells. However, the present invention is not limited to any particular representation of the threshold matrix. In addition, while embodiments of the present invention are described with reference to a bilevel printer, aspects of the present invention are equally applicable to other types of output devices as well, such as multitone printers, monochrome and color display devices, and the like.

In addition, the concepts apply to the IBM InfoPrint Color 130 Plus printer which prints fourteen intermediate values plus a fully saturated value (i.e. 4-bits per output) per color component. This printer uses a threshold matrix to determine when to allow printing. Input values less than the threshold value are forced to zero (i.e., printing off). The input value minus the threshold value is used to index a downloadable table for all input values greater than or equal to the threshold value. This table could contain a ramp of increasing intermediate values and finish with the fully saturated value.

Terminology

Before describing an illustrative printing environment in which various embodiments of the present invention may be implemented, brief definitions of terms used throughout this application are given below.

"Halftoning" is a widely used mechanism for converting input pixels represented with multiple bits of information (usually 8 bits) into bilevel pels to give the illusion of multitones. For color images, each color component is usually halftoned separately as if it were a monochrome image. For the purposes of this specification, the examples are given for pixels (or samples) with only one component. Those skilled in the art will understand how to extend the concepts to multi-component images.

A "threshold matrix" is a conventional data structure used in connection with halftoning. Traditionally, a threshold matrix is represented as a two dimensional (2D) array of threshold values. The threshold values determine the input level for which the output (e.g., a bilevel pel) transitions from the off to on output state.

As used herein, a "threshold array" generally refers to a data structure that is conceptually tiled, both horizontally and vertically, to cover an input image thereby defining a pel output level for each input sample of the input image. In one embodiment, the threshold array may be an array of threshold matrices. The maximum number of transitions for any position determines the number of matrices needed whose outputs are voted (e.g., exclusive ORed to determine the appropriate output level). For example, three traditional threshold matrices may be used in combination to allow any given position to be turned on and then off before remaining on. In another embodiment, the threshold array may be conceptually thought of as a three dimensional (3D) array indexed by u, v, and gray level; where u, and v are the x and y position in the input image modulo N and M (the dimensions of the supercell or the basic cell).

"Voting" is any process of reducing more than one result, input or output to a single result, input or output. The "Exclusive OR" function is one example of such a process.

For multitone (per component) printers the threshold array can be used to specify a gradual change (i.e., a ramp) from off (no printing) to fully saturated on and then another gradual change from on to off. In this case, the output is multi-bit rather than one bit. When the threshold array is composed of multiple threshold matrices, the first matrix could initiate a ramp of increasing intensities. The next matrix could initiate a ramp of decreasing intensities and so on.

Exemplary Printing Environment

Figure 3:
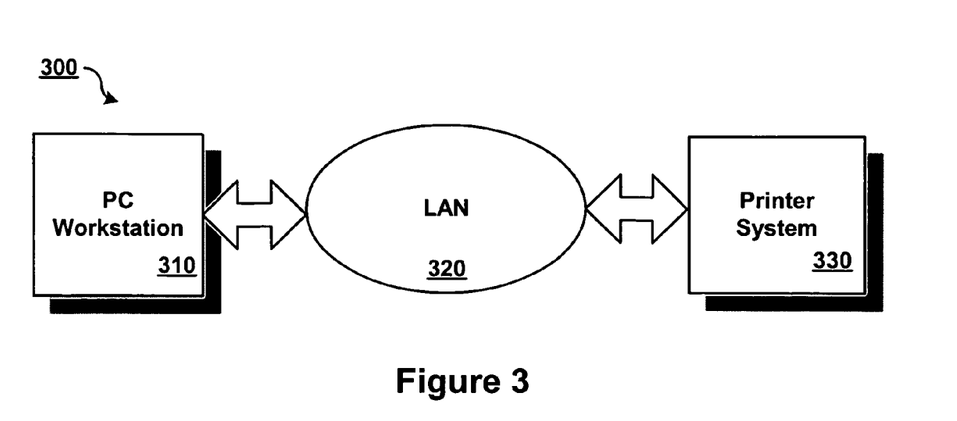
FIG. 3 is a simplified block diagram depicting a local area network (LAN) printing environment.
Figure 4:
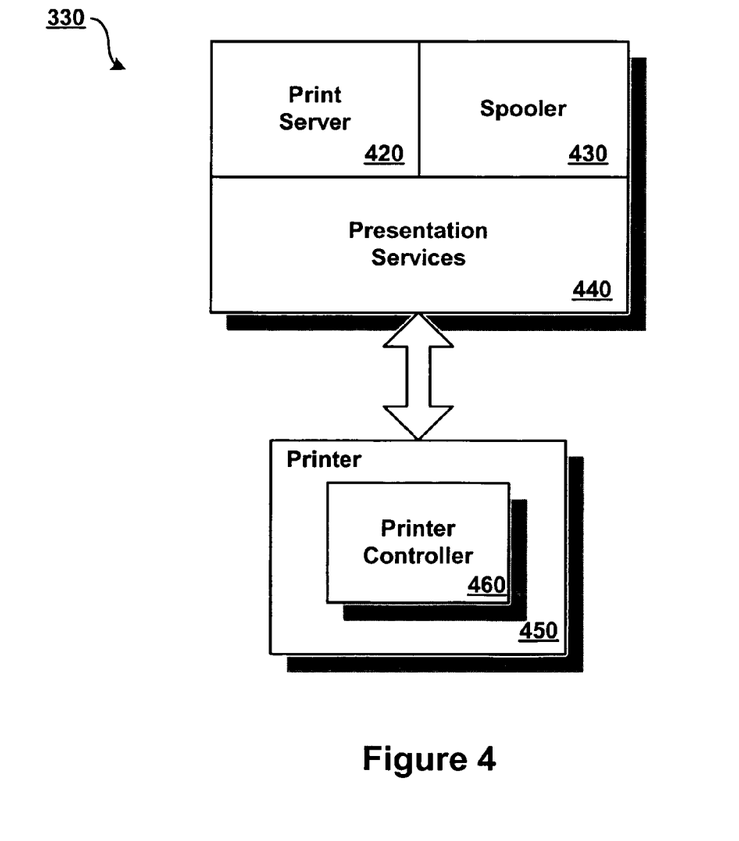
FIG. 4 illustrates a more detailed block diagram of a printer system according to one embodiment of the present invention.

A simplified printing environment 300 will briefly be described with reference to FIGS. 3 and 4. In this example, a personal computer workstation 310 is coupled to a printer system 330 via a LAN 320. According to one embodiment, the printer system 330 includes a spooler 430 for controlling the spooling of data files and presentation services 440 for generating appropriate commands to drive an attached printer 450. The printer system 330 may also include other components that are not shown for performing basic tasks, such as monitoring and configuring attached printers, and providing print job management. At any rate, when the PC workstation 310 has data to print, it sends print data to the print server 420. Among the functions typically provided by the print server 420 is the conversion of the data stream containing the print data to a data stream supported by the printer 450 to which the print data is destined. For instance, the printer 450 may accept the Intelligent Printer Data Stream (IPDS), PostScript, or some other printer data stream. As a result, the printer system 330 may also include a means for converting between the various input data streams that may be received and the data streams accepted by the printer 450. The print server 420 may also be configured to perform digital halftoning to allow a halftone image representation of an input image to be output by the printer 450. Alternatively, the novel, flexible, halftoning processing described herein may be performed local to the printer 450, e.g., by the printer controller 460.

An Exemplary Computer Architecture

Figure 5:
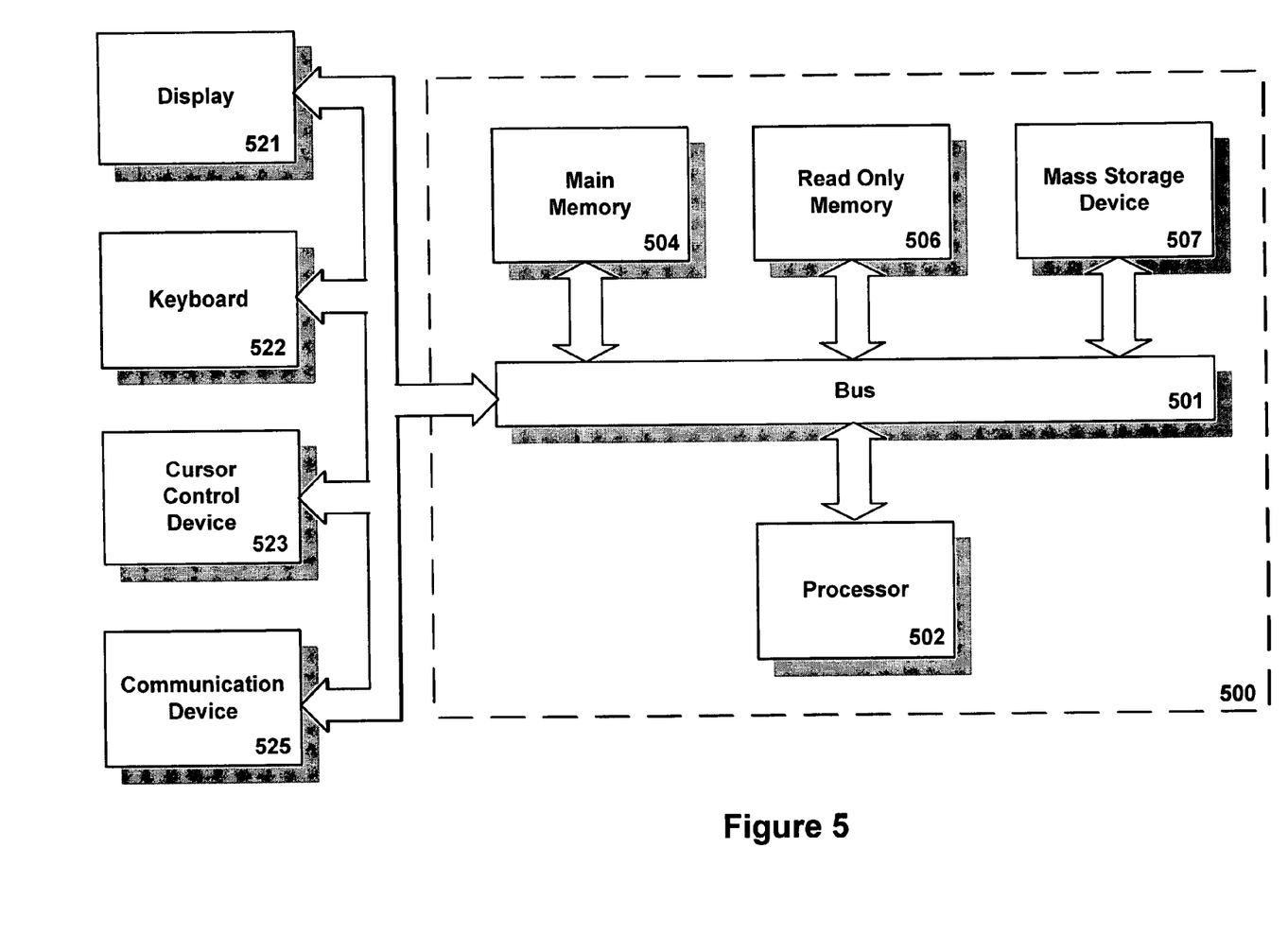
FIG. 5 illustrates a device in the form of a computer system in which features of the present invention may be implemented.

Having briefly described an exemplary environment in which the present invention may be employed, an exemplary machine in the form of a computer system 500 in which features of the present invention may be implemented will now be described with reference to FIG. 5. Computer system 500 may represent a workstation, host, server, print server, or printer controller. Computer system 500 comprises a bus or other communication means 501 for communicating information, and a processing means such as processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502.

A data storage device 507 such as a magnetic disk or optical disc and its corresponding drive may also be coupled to bus 501 for storing information and instructions. Computer system 500 can also be coupled via bus 501 to a display device 521, such as a cathode ray tube (CRT) or Liquid Crystal Display (LCD), for displaying information to an end user. Typically, an alphanumeric input device 522, including alphanumeric and other keys, may be coupled to bus 501 for communicating information and/or command selections to processor 502. Another type of user input device is cursor control 523, such as a mouse, a trackball, or cursor direction keys for communicating direction information and command selections to processor 502 and for controlling cursor movement on display 521.

A communication device 525 is also coupled to bus 501. Depending upon the particular presentation environment implementation, the communication device 525 may include a modem, a network interface card, or other well-known interface devices, such as those used for coupling to Ethernet, token ring, or other types of physical attachment for purposes of providing a communication link to support a local or wide area network, for example. In any event, in this manner, the computer system 500 may be coupled to a number of clients and/or servers via a conventional network infrastructure, such as a company's Intranet and/or the Internet, for example.

The present invention is related to the use of computer system 500 to direct the execution of one or more software and/or firmware routines to perform halftoning via multiple threshold arrays or via a table lookup as discussed herein. As computer system 500 executes the one or more routines, the processor 502 may access an input image stored within main memory 504, ROM 506, or another storage device to manipulate the input image in accordance with desired presentation attributes. Importantly, the present invention is not limited to having all of the routines located on the same computer system. Rather, individual objects, program elements, or portions thereof may be spread over a distributed network of computer systems. Additionally, it is appreciated that a lesser or more equipped computer system than the example described above may be desirable for certain implementations. Therefore, the configuration of computer system 500 will vary from implementation to implementation depending upon numerous factors, such as price constraints, performance requirements, and/or other circumstances. For example, according to one embodiment of the present invention, an embedded printer controller may comprise only a processor and a memory for storing static or dynamically loaded instructions and/or data.

An Exemplary Halftoning System

Figure 6:
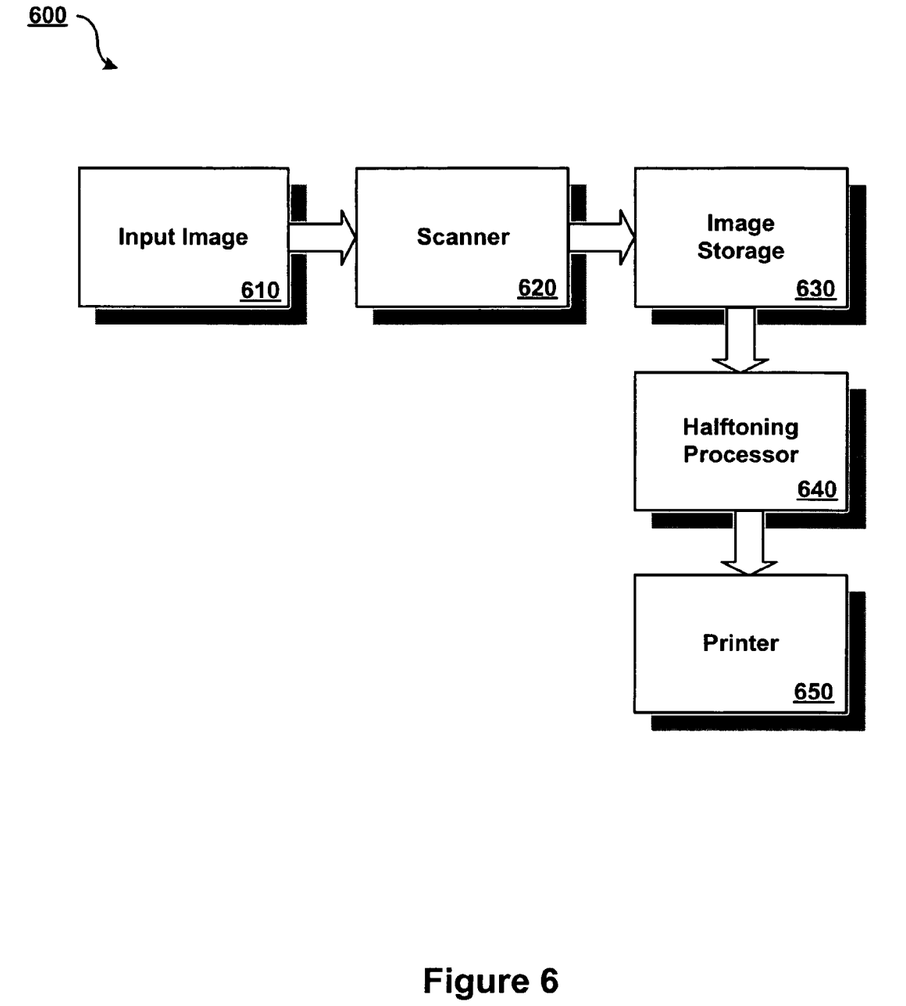
FIG. 6 is a block diagram of a halftoning system according to one embodiment of the present invention.

FIG. 6 illustrates a block diagram of a halftoning system according to one embodiment of the present invention. In this example, an input image 610 is scanned by a scanner 620 and stored in image storage 630. A halftoning processor 640 processes the stored image, if needed, to match the spatial sample frequency of the stored image to the spatial frequency of the printer's pels. Halftoning processor 640 then processes this modified image by using a novel threshold array to determine whether a pel from the input image will be printed as a dot as discussed further below. The output of the halftoning processor 640 is input to the printer 650.

Basic Pattern Growth

Figure 7:
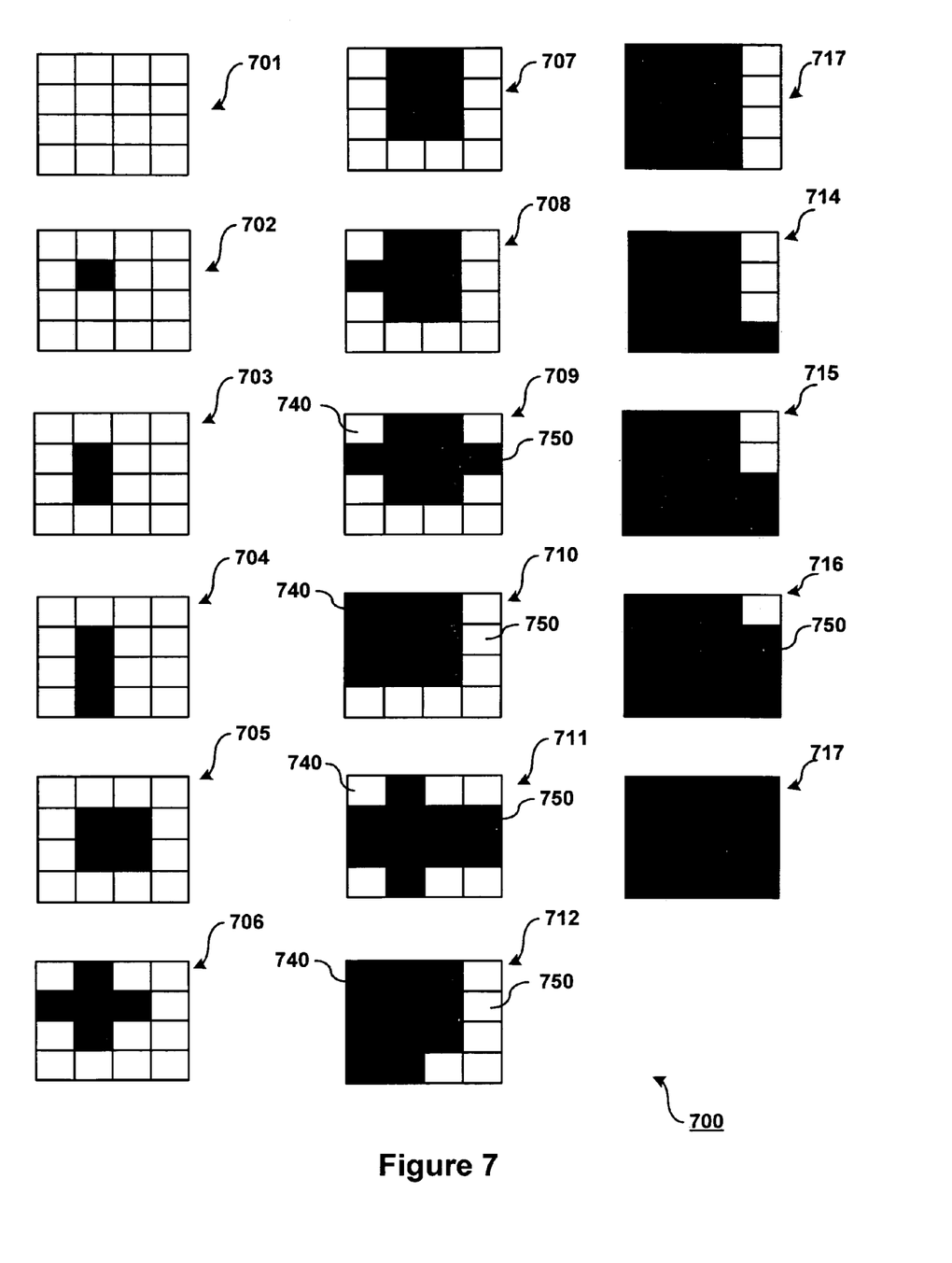
FIG. 7 illustrates a basic pattern growth example according to one embodiment of the present invention.

Referring now to FIG. 7, a basic pattern growth example according to one embodiment of the present invention will be described. As in the previous example, a 4×4 halftone matrix allows 17 output levels to be generated, i.e., white 701 and 16 other levels 702–717. Importantly, however, in this example, elements of the basic pattern may make multiple transitions between on and off. For example, element 740 in the upper left transitions from the off state in basic pattern 709 to the on state in basic pattern 710, back to off in basic pattern 711, and on to stay in basic pattern 712. Advantageously, in this manner, more flexibility in terms of pattern choices is provided.

Halftoning via Multiple Threshold Arrays

Figure 8A:
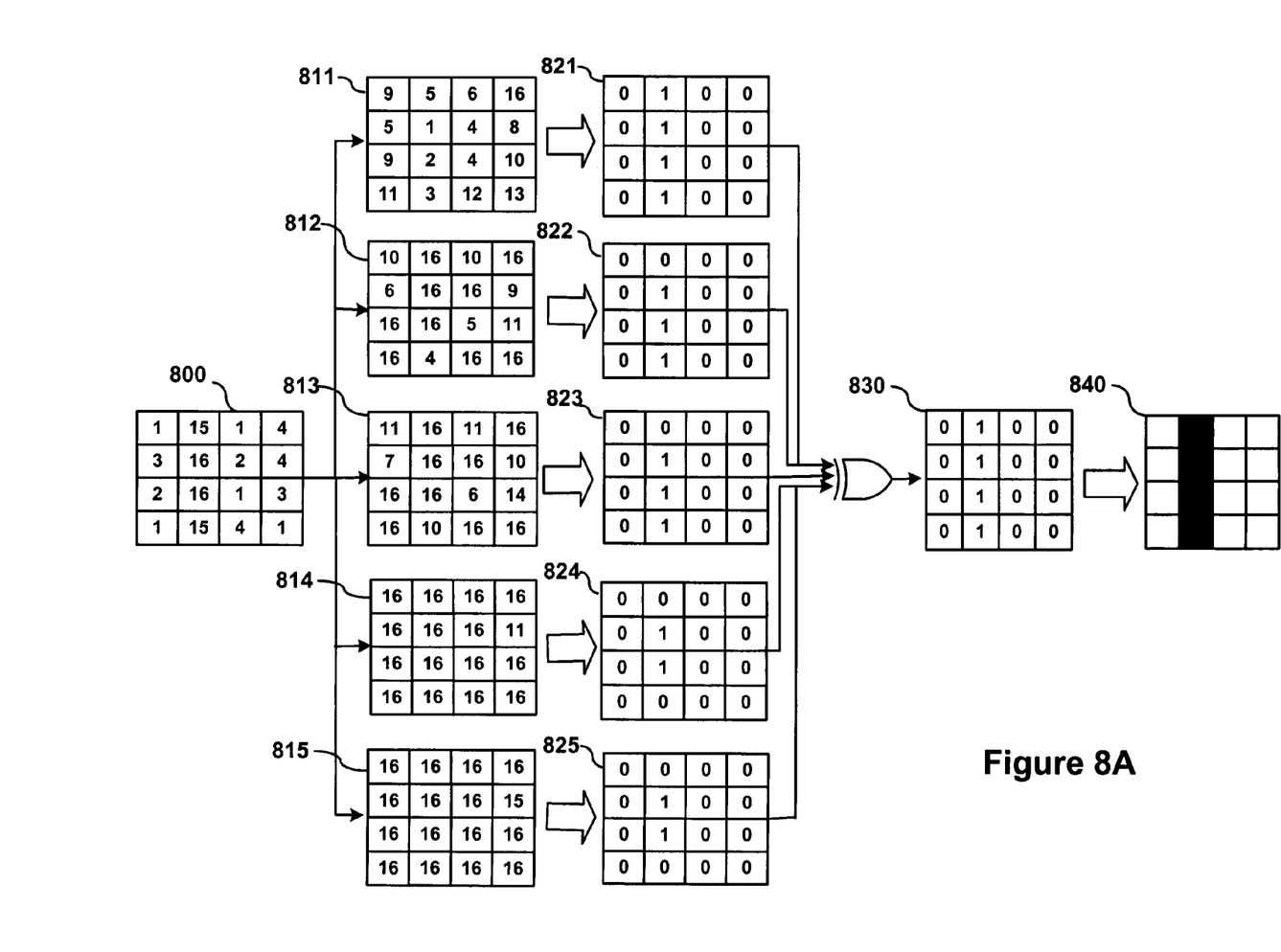
FIG. 8A conceptually illustrates how multiple threshold matrices are employed according to one embodiment of the present invention.

FIG. 8A illustrates an example of using multiple threshold matrices to allow basic cell patterns to be built by other than subsets of each other. The number of threshold matrices is set by the maximum number of transitions for any particular position in the basic cell. The five threshold matrices illustrated in FIG. 8A have been derived based upon the patterns of FIG. 7. The convention used by this example is if the input value is less than the threshold at a given position, then a zero is output; otherwise a one is output. In this example, the five transitions experienced by element 750 in the second row, fourth column dictate the number of matrices needed. If the input image is smaller than the output image, the halftoning processor 640 may first scale it (e.g., interpolate it) to the appropriate size.

At any rate, a 4×4 sample 800 from an input image is input to threshold matrices 811–815. The resulting patterns 821–825, respectively, are subsequently combined via an exclusive OR operation, for example, to produce a final pattern 830 which is used to cause the output device (e.g., a bilevel printer) to appropriately deposit ink or toner as shown by output pattern 840.

While there are a very large number of possible combinations of threshold matrices, in this example, the convention has been adopted that the first time a position has non-zero output is in the top matrix, the next matrix down turns it off, it is turned on again in the third, and so on. Additionally, while in practice the dynamic range of the input data is usually from 0 to 255 and is thresholded with much larger cells, e.g., supercells, for convenience, the dynamic range of the input image in this example is limited to between 0 and 16, inclusive.

Figure 8B:
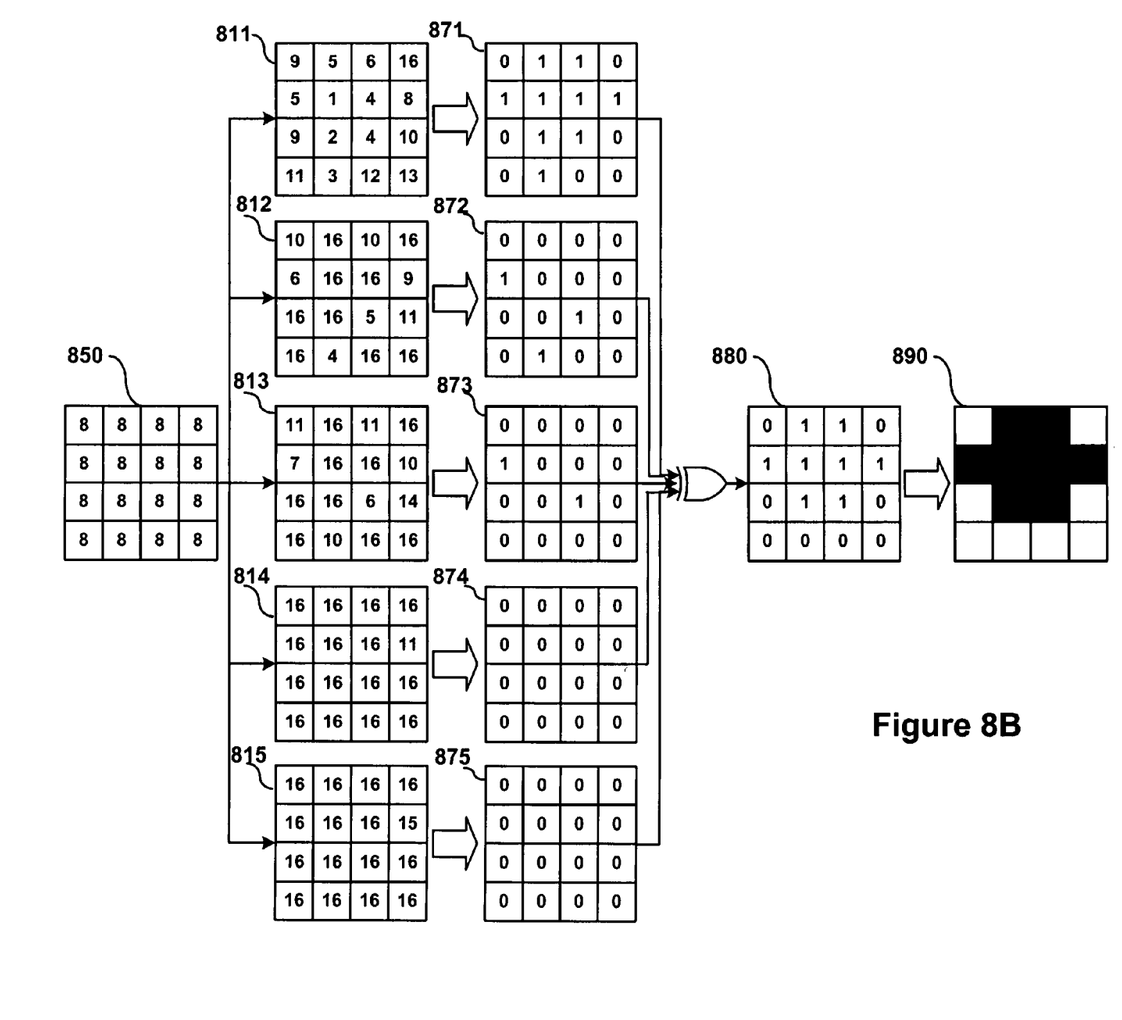
FIG. 8B illustrates a special case of FIG. 8A in which the input matrix is constant.

FIG. 8B illustrates a special case of FIG. 8A in which the input matrix 850 is constant. In this example, because the 4×4 sample 850 has constant input, the output 890 matches the eighth gray level 709 shown in FIG. 7. As above, each threshold matrix 811–815 is applied to the sample 850 to create a binary output 871–875. These outputs 871–875 are then XORed to generate the output image (illustrated both as a binary image 880 and as black and white pels 890).

Figure 9:
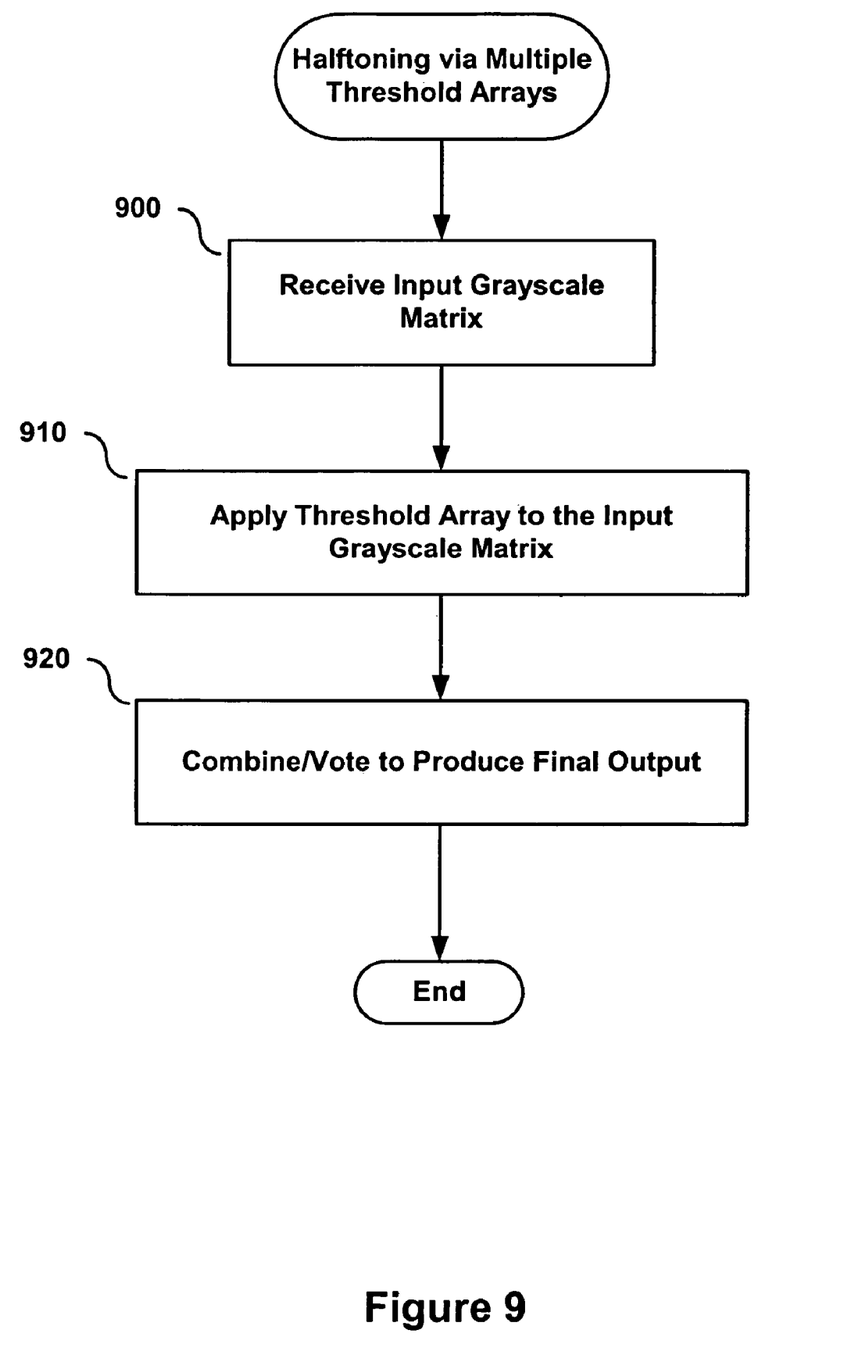
FIG. 9 is a flow diagram illustrating halftoning processing using multiple threshold arrays according to one embodiment of the present invention.

FIG. 9 is a flow diagram illustrating halftoning processing using multiple threshold arrays according to one embodiment of the present invention. In one embodiment, the processing blocks described below may be performed under the control of a programmed processor, such as processor 502. However, in alternative embodiments, the processing blocks may be fully or partially implemented by any programmable or hardcoded logic, such as Field Programmable Gate Arrays (FPGAs), TTL logic, or Application Specific Integrated Circuits (ASICs), for example.

At processing block 900, an input grayscale image, such as 4×4 sample 800, is received. At processing block 910, a threshold array (e.g., threshold matrices 811–815) is applied to the input grayscale image producing intermediate outputs (e.g., binary outputs 821–825). Finally, the intermediate outputs are voted (e.g., combined by an exclusive OR) in block 920 to produce the final output (e.g., binary image 830).

Figure 10A:
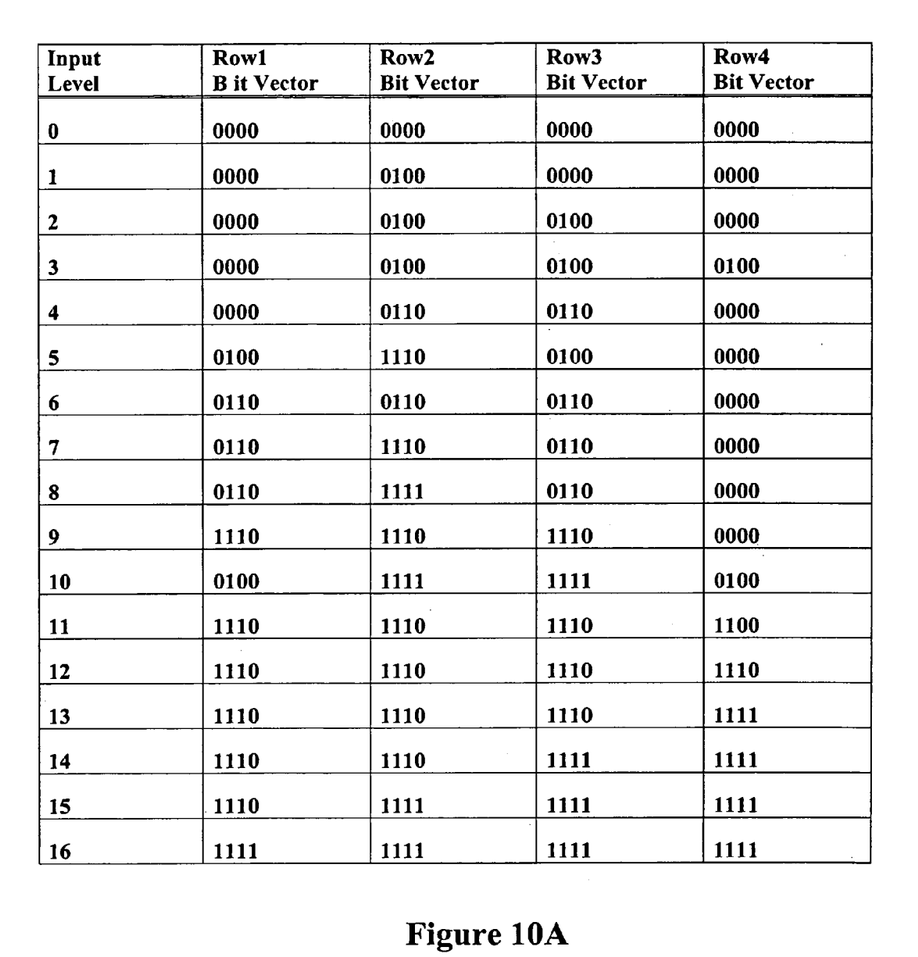
FIG. 10A illustrates a table of bit-vectors for creating the basic patterns of FIG. 7 according to one embodiment of the present invention.

Halftoning via Table Lookup FIG. 10A illustrates a table of bit-vectors for creating the basic patterns of FIG. 7 according to one embodiment of the present invention. In this example, each index accesses sixteen bits representing a 4×4 pattern of FIG. 7. A constant input level of zero corresponds to pattern 701, a 4×4 square of zero outputs, where zero is white and one is black. A constant input level of eight corresponds to pattern 709, which has eight elements on and the remainder off. Such a table unambiguously defines the output for each constant input. This may be useful when large areas of graphics are employed. However, other organizations may be more efficient for rapidly changing image data, such as from cameras and scanners.

Figure 10B:
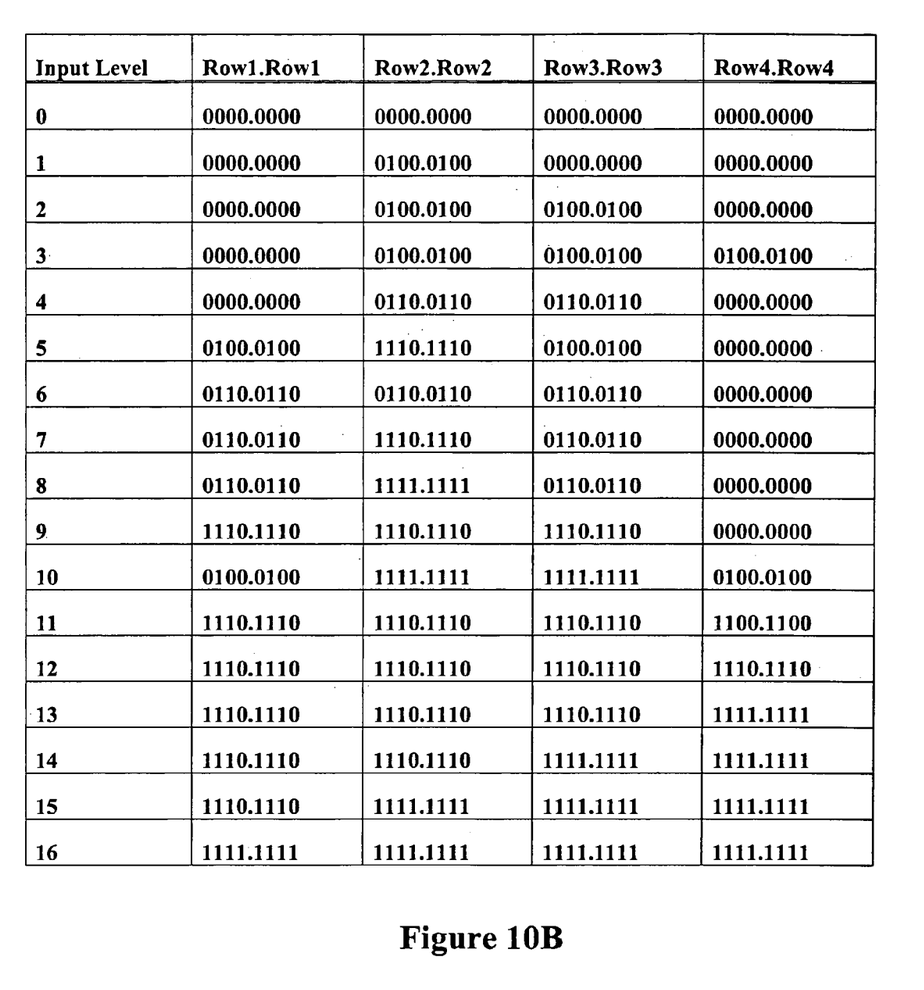
FIG. 10B illustrates an output optimization of FIG. 10A according to one embodiment of the present invention in which one access yields 8 pels of output assuming constant input values.

FIG. 10B illustrates an output optimization of FIG. 10A according to one embodiment of the present invention in which one access yields eight pels of output assuming constant input values. In general, the idea is to gather rows of data together to provide more efficient cache access as the output is generated on a row-by-row basis. Specifically, in this example, two copies of each row are provided in each table entry. As a result, when constant input values are encountered, a single table lookup provides eight pels of output. If the input is not constant, the extra information can be masked off and ignored. Of course, with a larger matrix, it may not be convenient to store two copies of the output. For example, one row of a 32×32 matrix would typically be stored as a 32-bit word rather than duplicating the data as depicted in FIG. 10B.

Figure 11:
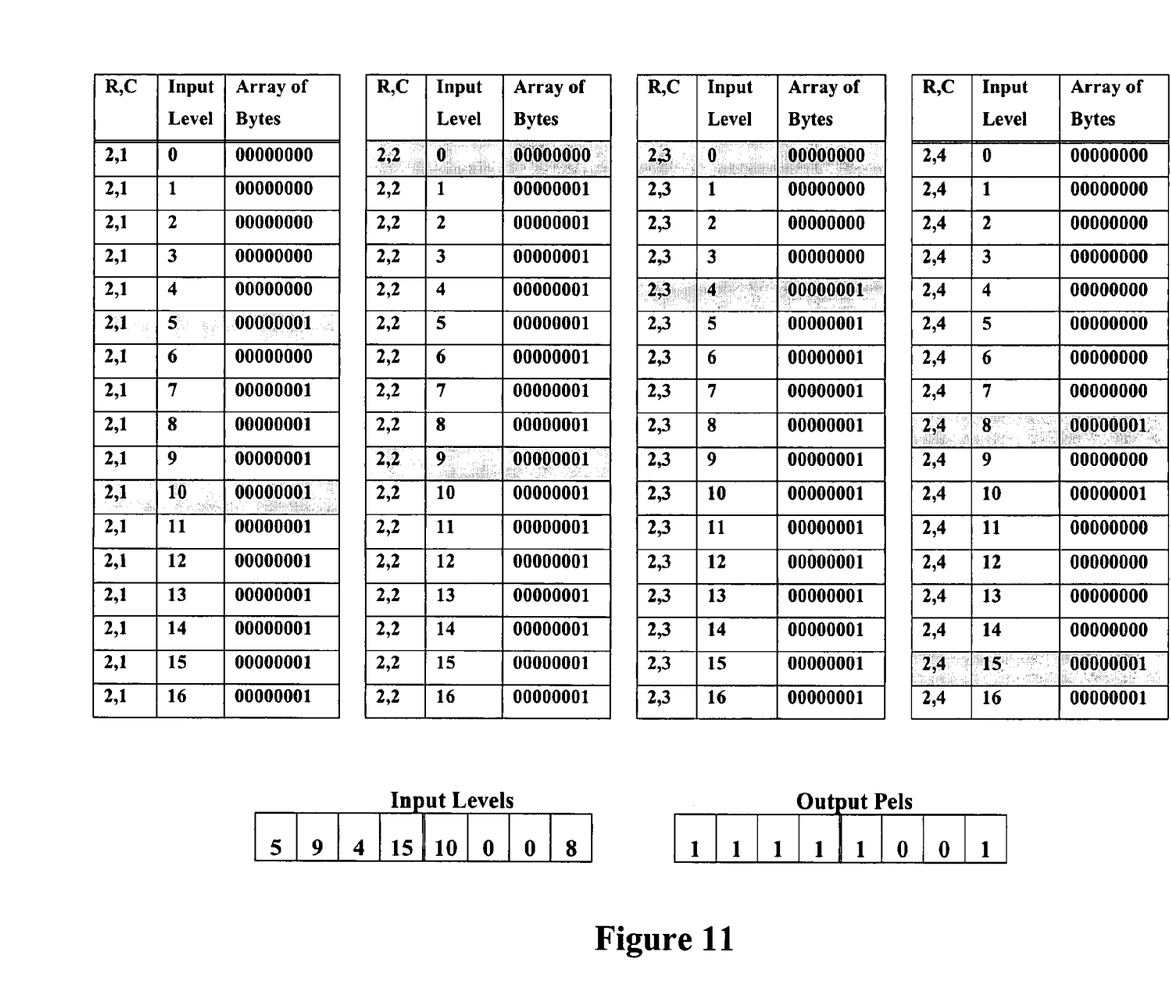
FIG. 11 illustrates a table organized for more efficient output pel retrieval according to one embodiment of the present invention.

FIG. 11 illustrates a table organized for more efficient output pel retrieval according to one embodiment of the present invention. In this example, for convenience, a threshold array 1100 has been derived based upon the patterns of FIG. 7. For each row and column (R,C) 1101 and each input level 1102, the threshold array 1100 includes an array of bytes 1103. According to the convention used by this example, the array of bytes 1103 includes a one in the least significant bit (LSB) (i.e., the right most bit) if the input level 1102 corresponds to a pel in the on state at the appropriate position (row 2, columns 1–4, in this example) in the corresponding basic pattern 701–717. For example, when the input pel sample corresponds to basic pattern 701 (e.g., the input level is 0), then row 2, column 1 represents an output pel in the off state and therefore the array of bytes is all zeroes. In contrast, when the input pel sample corresponds to basic pattern 706 (e.g., input level 5), then row 2, column 1 represents an output pel in the on state and therefore the array of bytes has a one in the LSB.

It is contemplated that various other threshold array organizations may be employed. For example, rather than indexing the threshold array by (R,C) and input level, an alternative threshold organization would be to index the threshold array based upon three parameters: the input level, the x coordinate of the pel, and the y coordinate of the pel. For example, as mentioned above, according to one embodiment, the threshold array may be conceptually thought of as a three dimensional (3D) array indexed by u, v, and gray level; where u, and v are the x and y position in the input image modulo N and M (the dimensions of the supercell or the basic cell).

Figure 12:
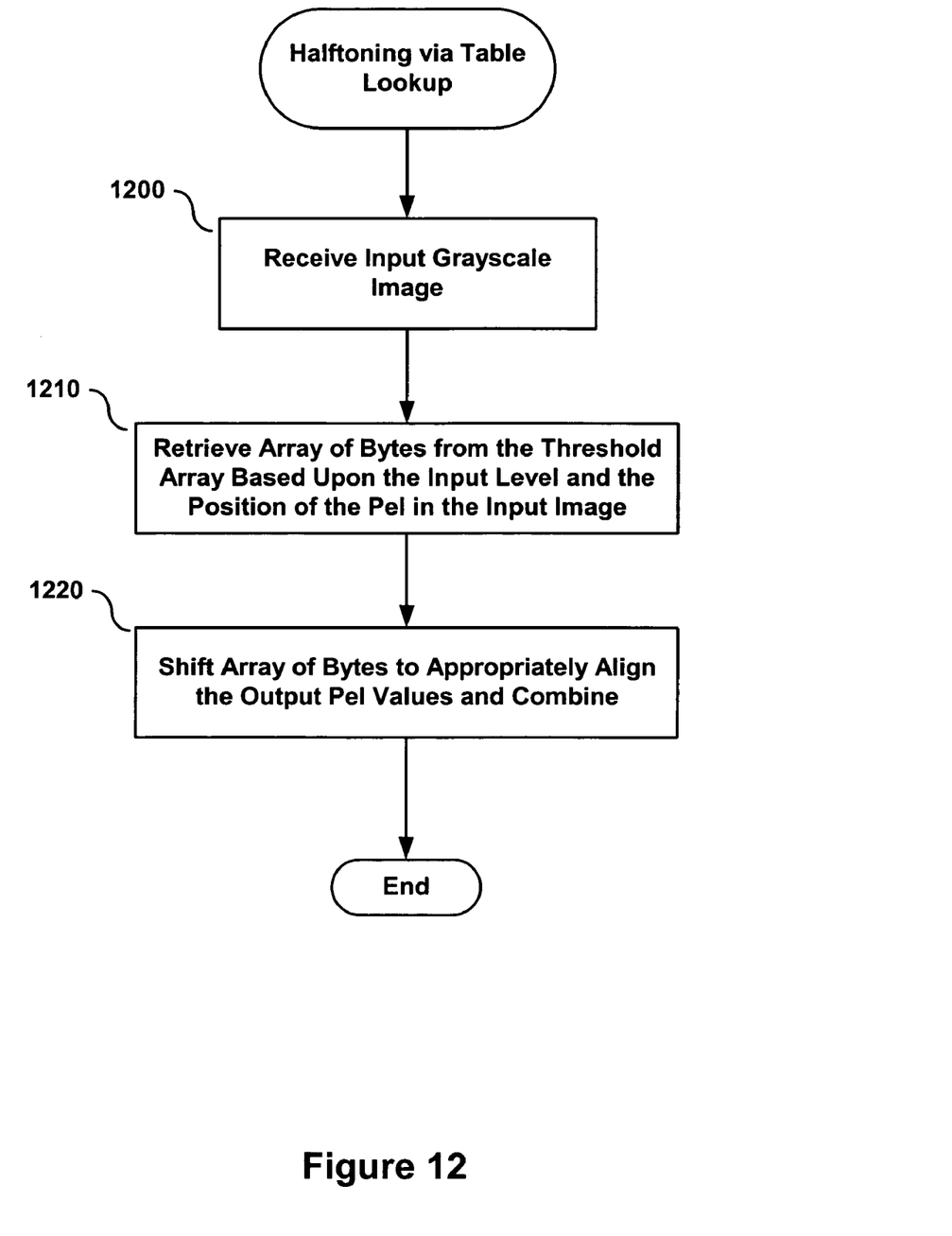
FIG. 12 is a flow diagram illustrating halftoning processing via table lookups according to another embodiment of the present invention.

FIG. 12 is a flow diagram illustrating halftoning processing via table lookups according to one embodiment of the present invention. At processing block 1200, an input grayscale image, such as input levels 1111–1118, is received. At processing block 1210, an array of bytes is retrieved from the threshold array 1100 based upon the input level of the current pel and the position of the pel in the input image. Then, at processing block 1220, the array of bytes retrieved is shifted to appropriately align the output pel value.

Referring back to FIG. 11, a concrete example of how an input sample is transformed into appropriate halftoned output values will now be described with reference to threshold array 1100 (specifically, threshold array entries 1131–1138), input levels 1111–1118, and output pels 1121–1128. In order to determine the output pel value for input level 1111, the array of bytes 1103 from entry 1131 is retrieved from threshold array 1100 and the LSB is shifted 7 bits to the left. Similarly, to determine the output pel value for input level 1112, the array of bytes 1103 from entry 1132 is retrieved and then shifted 6 bits to the left. The output pel value from input level 1113 is determined by retrieving entry 1133 and left shifting the LSB of the array of bytes 1103 by 5 bits. The upper nibble of output pels is completed with the LSB of the array of bytes 1103 corresponding to entry 1134 left shifted 4 bits. The lower nibble of output pels is similarly generated based upon entries 1135–1138 left shifted 3, 2, 1, and 0 bits respectively. Finally, the eight shifted bytes are combined to produce one output byte.

In an alternative embodiment, the one bit in the array of bytes 1103 may be positioned such that it is already in the appropriate position for the output pel vector if the output pel corresponds to the lower nibble of the output pel vector and can be adjusted for the upper nibble of the output pel vector by a constant shift.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A flexible halftoning threshold array configured to allow more than one transition in output values as a function of possible input values for at least one position in the halftoning threshold array, the flexible halftoning threshold array comprising a vector for each position in the flexible halftoning threshold array that directly identifies an output level for each possible input level, the vectors being optimized for row access and constant input.

2. The flexible halftoning threshold array of claim 1, comprising a plurality of binary threshold matrices the outputs of which can be combined to produce the output image.

3. The flexible halftoning threshold array of claim 2, wherein the combination of outputs of the plurality of binary threshold matrices is accomplished with an exclusive OR operation.

4. The flexible halftoning threshold array of claim 1, wherein each position of the vector is capable of specifying only two output levels.

5. The flexible halftoning threshold array of claim 1, wherein each position of the vector comprises a single bit.

6. The flexible halftoning threshold array of claim 1, wherein the vectors are organized in order of expected access.

7. The flexible halftoning threshold array of claim 1, wherein the vectors are clustered for more efficient access.

8. The flexible halftoning threshold array of claim 1, wherein each position of the vector is capable of specifying more than two output levels.

9. The flexible halftoning threshold array of claim 1, wherein each position of the vector comprises a byte.

10. A machine-readable medium having stored thereon data representing sequences of instructions, the sequences of instructions which, when executed by a processor, cause the processor to:
  receive an input image; and
  determine a level to be output for a plurality of pels of an output image corresponding to the input image by applying a threshold array, the threshold array capable of allowing multiple transitions between on and off output states as a function of an input value for any given position.

11. The machine-readable medium of claim 10, wherein the sequences of instructions further include instructions which, when executed by the processor, cause the processor to apply a plurality of threshold matrices to each input value and voting among their outputs to determine the output level.

12. The machine-readable medium of claim 10, wherein the threshold array comprises a bit vector for each position, the bit vectors identifying the output level for each possible input at the position.

13. The machine-readable medium of claim 12, wherein the bit vectors are clustered for more efficient access.

14. The machine-readable medium of claim 10, wherein the threshold array initiates printing with intermediate intensities before reaching an extreme of fully saturated printing or no printing on a multitone printer.

* * * * *